(12) United States Patent
Hawliczek et al.

(10) Patent No.: US 9,698,720 B2
(45) Date of Patent: *Jul. 4, 2017

(54) METHOD FOR PROVIDING A SUPPLY VOLTAGE AND ELECTRICAL DRIVE SYSTEM

(71) Applicant: Robert Bosch GmbH, Stuttgart (DE)

(72) Inventors: Sebastian Hawliczek, Kornwestheim (DE); Peter Feuerstack, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/649,283

(22) PCT Filed: Nov. 26, 2013

(86) PCT No.: PCT/EP2013/074773
§ 371 (c)(1),
(2) Date: Jun. 3, 2015

(87) PCT Pub. No.: WO2014/086624
PCT Pub. Date: Jun. 12, 2014

(65) Prior Publication Data
US 2016/0218656 A1  Jul. 28, 2016

(30) Foreign Application Priority Data
Dec. 5, 2012  (DE) .......... 10 2012 222 343

(51) Int. Cl.
*H02P 1/00* (2006.01)
*H02P 27/06* (2006.01)
(Continued)

(52) U.S. Cl.
CPC .......... *H02P 27/06* (2013.01); *B60L 11/1853* (2013.01); *B60L 11/1864* (2013.01);
(Continued)

(58) Field of Classification Search
CPC .. H01M 10/625; H01M 10/637; H01M 10/65; H01M 2/1072; H01M 2/1077;
(Continued)

(56) References Cited

U.S. PATENT DOCUMENTS 5,642,275 A     6/1997   Peng et al.
5,960,898 A  *  10/1999  Okada .................. B60L 11/005
                                                 180/65.8

(Continued)

FOREIGN PATENT DOCUMENTS

CN     1174790     3/1998
CN     102007666   4/2011
(Continued)

OTHER PUBLICATIONS

International Search Report for Application No. PCT/EP2013/074773 dated Jan. 30, 2015 (English Translation, 3 pages).

*Primary Examiner* — Paul Ip
(74) *Attorney, Agent, or Firm* — Michael Best & Friedrich LLP

(57) ABSTRACT

The invention relates to an electrical drive system having: an energy storage device for generating a supply voltage and having at least one energy supply line, with one or more energy storage modules connected in series in the energy supply line, each module comprising an energy storage cell module with at least one energy storage cell and a coupling device with a plurality of coupling elements which is designed to selectively connect the energy storage cell module into the respective energy supply line or to bypass the same in the respective energy supply line; a fuel cell system which is coupled to the output terminals of the energy storage device and connected in parallel to the energy storage device; and a control device which is coupled to the energy storage device and is designed to control the coupling devices of the energy storage modules in order to adjust a
(Continued)

supply voltage at the output terminals of the energy storage device which corresponds to an output voltage of the fuel cell system.

9 Claims, 3 Drawing Sheets

(51) Int. Cl.
*B60L 11/18* (2006.01)
*H02J 7/34* (2006.01)
*H01M 16/00* (2006.01)
*H02J 3/38* (2006.01)

(52) U.S. Cl.
CPC ....... *B60L 11/1887* (2013.01); *H01M 16/003* (2013.01); *H01M 16/006* (2013.01); *H02J 7/34* (2013.01); *H01M 2220/20* (2013.01); *H02J 3/382* (2013.01); *Y02E 60/721* (2013.01); *Y02T 10/7061* (2013.01); *Y02T 90/34* (2013.01); *Y04S 10/126* (2013.01)

(58) Field of Classification Search
CPC ........... H01M 10/3909; H01M 10/448; H01M 10/46; H01M 10/48; H01M 10/486; H01M 10/613; H01M 10/627; H01M 10/633; H01M 10/656
USPC ............... 318/139, 400.02, 400.12; 320/116; 180/65.8
See application file for complete search history.

(56) References Cited

U.S. PATENT DOCUMENTS

| | | | | |
|---|---|---|---|---|
| 6,058,032 A * | 5/2000 | Yamanaka | ......... | B60L 11/1803 318/768 |
| 7,282,814 B2 * | 10/2007 | Jacobs | ................. | H02J 7/0018 307/82 |
| 7,829,229 B1 | 11/2010 | Maier et al. | | |
| 8,103,401 B2 * | 1/2012 | Kubo | ................. | B60L 11/1855 320/116 |
| 8,159,184 B2 * | 4/2012 | Emori | ................. | B60L 3/0046 307/10.1 |
| 8,401,728 B2 * | 3/2013 | Kubo | ................. | B60L 11/1855 324/522 |
| 8,649,935 B2 * | 2/2014 | Kubo | ................. | B60L 11/1855 324/522 |
| 9,231,404 B2 * | 1/2016 | Tiefenbach | ......... | B60L 11/1853 |
| 9,413,046 B2 * | 8/2016 | Feuerstack | ........ | H01M 10/0525 |
| 2005/0194937 A1 * | 9/2005 | Jacobs | ................. | H02J 7/0018 320/135 |
| 2006/0021812 A1 | 2/2006 | Saeki et al. | | |
| 2009/0085516 A1 * | 4/2009 | Emori | ................. | B60L 3/0046 320/118 |
| 2009/0087722 A1 * | 4/2009 | Sakabe | ................. | B60L 3/0046 429/61 |
| 2009/0091332 A1 * | 4/2009 | Emori | ................. | B60L 11/1855 324/537 |
| 2009/0130541 A1 * | 5/2009 | Emori | ................. | H02J 7/0019 429/61 |
| 2009/0198399 A1 * | 8/2009 | Kubo | ................. | B60L 11/1855 701/22 |
| 2010/0097031 A1 * | 4/2010 | King | ................. | B60L 11/1803 320/109 |
| 2010/0213897 A1 * | 8/2010 | Tse | ........ | H02J 7/0014 320/116 |
| 2010/0316921 A1 | 12/2010 | Yoshida et al. | | |
| 2011/0084648 A1 | 4/2011 | Cao et al. | | |
| 2011/0089886 A1 * | 4/2011 | Dubovsky | ................. | H02J 7/35 320/101 |
| 2012/0025769 A1 * | 2/2012 | Kikuchi | ................. | B60L 3/0046 320/118 |
| 2012/0133370 A1 * | 5/2012 | Kubo | ................. | B60L 11/1855 324/433 |
| 2012/0175953 A1 * | 7/2012 | Ohkawa | ................. | B60L 3/0046 307/18 |
| 2013/0026835 A1 * | 1/2013 | Ghosh | ................. | H02J 9/062 307/66 |
| 2013/0027126 A1 * | 1/2013 | Jayaraman | ............ | H02M 3/158 327/547 |
| 2013/0030737 A1 * | 1/2013 | Okada | ................. | G01R 31/3662 702/63 |
| 2013/0038289 A1 * | 2/2013 | Tse | ........ | H02M 3/158 320/118 |
| 2013/0154379 A1 * | 6/2013 | Tiefenbach | ......... | B60L 11/1853 307/77 |
| 2015/0044520 A1 * | 2/2015 | Feuerstack | ........ | H01M 10/0525 429/50 |
| 2015/0236614 A1 * | 8/2015 | Schuler | ................. | H02M 7/537 363/131 |

FOREIGN PATENT DOCUMENTS

| | | |
|---|---|---|
| DE | 102009000674 | 8/2010 |
| DE | 102010027857 | 10/2011 |
| DE | 102010027861 | 10/2011 |
| DE | 102011089297.4 | * 12/2011 |
| EP | 1233468 | 8/2002 |
| JP | 2010239711 | 10/2010 |

* cited by examiner

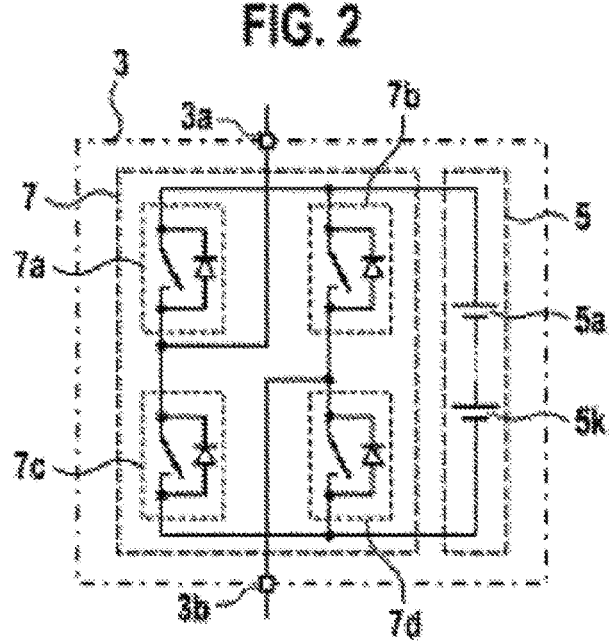
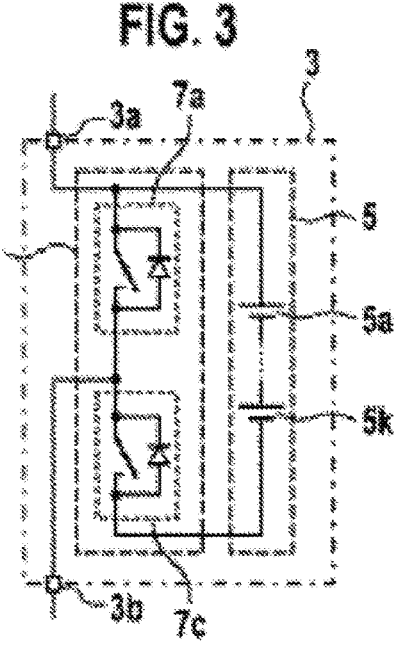
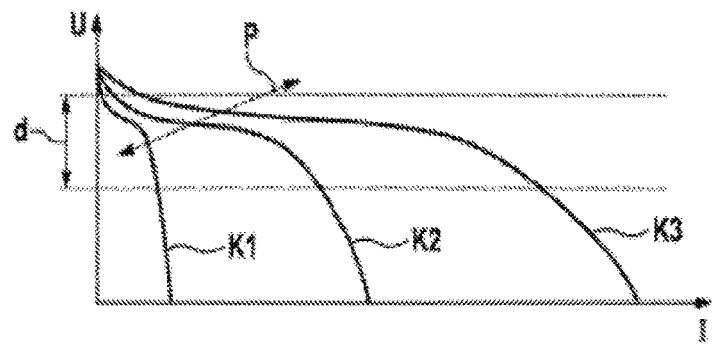

METHOD FOR PROVIDING A SUPPLY VOLTAGE AND ELECTRICAL DRIVE SYSTEM

BACKGROUND OF THE INVENTION

The invention relates to a method for providing a supply voltage and to an electrical drive system, in particular when supplying voltage to electric machines with a hybrid energy source system from a fuel cell and an electrical energy store.

It is apparent that, in the future, electronic systems which combine new energy storage technologies with electrical drive technology will be used more and more both in fixed applications such as, for example, wind power plants or solar plants, as well as in vehicles such as hybrid vehicles or electric vehicles.

In order to feed three-phase current into an electric machine, a direct voltage which is provided by a direct voltage intermediate circuit is conventionally converted into a three-phase alternating voltage by means of a power converter in the form of a pulse-controlled inverter. The direct voltage intermediate circuit is fed from a line of battery modules connected in series. In order to be able to satisfy the requirements placed on a respective application in terms of power and energy, frequently a plurality of battery modules are connected in series in one traction battery. Such an energy storage system is frequently used, for example, in electrically operated vehicles.

Document U.S. Pat. No. 5,642,275 A1 describes a battery system with an integrated inverter function. Systems of this type are known by the name Multilevel Cascaded Inverter or else Battery Direct Inverter (BDI). Such systems comprise direct current sources in a plurality of energy storage module lines which can be connected directly to an electric machine or an electrical power system. In this context, single-phase or multi-phase supply voltages can be generated. The energy storage module lines have here a multiplicity of energy storage modules which are connected in series, wherein each energy storage module has at least one battery cell and an assigned controllable coupling unit which permits the respective energy storage module line to be interrupted as a function of control signals, or the respectively assigned at least one battery cell to be bypassed or the respectively assigned at least one battery cell to be connected into the respective energy storage module line. By means of suitable actuation of the coupling units, for example using pulse width modulation, suitable phase signals for controlling the phase output voltage can also be provided, with the result that it is possible to dispense with a separate pulse-controlled inverter. The pulse-controlled inverter which is necessary to control the phase output voltage is therefore integrated into the battery.

As an alternative, documents DE 10 2010 027 857 A1 and DE 10 2010 027 861 A1 disclose battery cells which are connected in a modular fashion in energy storage devices which can be selectively coupled into the line of battery cells connected in series, or decoupled therefrom, by means of suitable actuation of coupling units. Systems of this type are known by the name battery direct converter (BDC). Such systems comprise direct current sources in an energy storage module line, which direct current sources can be connected to a direct voltage intermediate circuit for supplying electrical energy to an electric machine or an electric power system via a pulse-controlled inverter.

An alternative possible way of generating electrical energy for an electrical drive system is provided by fuel cells. In this context, fuel cell vehicles are frequently equipped with additional electrical energy stores in order, for example, to provide a temporary increase in power for the drive or to permit recuperation of braking energy. Hybrid fuel cell systems of this type can have, on the one hand, direct voltage transformers which serve in order to couple the fuel cells and the electric energy stores and in order to approximate the voltage ranges and power fluxes of the hybrid energy sources. On the other hand, corresponding operating strategies can be selected for the fuel cells in order to perform adaptation of the voltage and power flux such as is shown, for example in documents EP 1 233 468 A2 and U.S. Pat. No. 7,829,229 B1.

There is therefore a need for cost-effective options, which can be effected with little expenditure in terms of technical implementation, for providing hybrid energy source systems composed of fuel cells and electrical energy stores for supplying voltage to electrical drive systems.

SUMMARY OF THE INVENTION

The present invention provides, according to one aspect, an electrical drive system, having an energy storage device for generating a supply voltage which has at least one energy supply line having in each case one or more energy storage modules which are connected in series in the energy supply line and which each comprise an energy storage cell module with at least one energy storage cell, and a coupling device with a plurality of coupling elements, which is configured to connect the energy storage cell module selectively into the respective energy supply line or to bypass it in the respective energy supply line, a fuel cell system which is coupled to the output terminals of the energy storage device or is connected in parallel with the energy storage device, and a control device which is coupled to the energy storage device and which is configured to actuate the coupling devices of the energy storage modules in order to set at the output terminals of the energy storage device a supply voltage which corresponds to an output voltage of the fuel cell system.

According to a further aspect, the present invention provides a method for providing a supply voltage in an electrical drive system according to the invention, having the steps of determining a current output voltage of the fuel cell system, of actuating the coupling devices of a first number of energy storage modules of the energy storage device in order to connect the respective energy storage cell modules into the energy supply line, of actuating the coupling devices of a second number of energy storage modules of the energy storage device in order to bypass the respective energy storage cell modules in the energy supply line, and of determining the first and second number of energy storage modules of the energy storage device in such a way that the supply voltage at the output terminals of the energy storage device is adapted to the determined output voltage of the fuel cell system.

A concept of the present invention is to connect an energy storage device to one or more energy supply lines of modular design composed of a series connection of energy storage modules directly in parallel with a fuel cell system and to adapt the output voltage of the energy storage device to the requirements of the fuel cell system by actuating the energy storage modules on a modular basis.

The modular design of the energy supply lines advantageously makes possible fine gradation of the entire output voltage of the energy storage device, for example by means of the phase-shifted actuation of the respective coupling units for the individual energy storage cell modules or the pulse-width-modulated actuation of individual energy storage modules.

An energy storage device which is adapted to the working voltage of the fuel cell in a variable fashion makes it possible to dispense with separate power electronics, for example a direct voltage transformer, for coupling the energy storage device to the fuel cell. As a result, on the one hand the installation space requirement and the system weight of the drive system can be reduced. On the other hand, less cooling power is necessary for the power electronics, with the result that overall favorable components with low power requirements and/or cooling requirements can be used.

By using an energy storage device of modular design it is possible to simplify the battery management system, since only actuation on a modular basis is necessary. Furthermore, the energy storage device can be scaled in a simple way by modifying the number of energy supply lines or the number of installed energy storage modules per energy supply line without further adaptation problems. As a result, different variants of fuel cell systems can be supported in a cost-effective way.

According to one embodiment of the drive system according to the invention, the drive system can also have at least one storage inductor which is coupled between one of the output terminals of the energy storage device and the fuel cell system.

According to a further embodiment of the drive system according to the invention, the drive system can also have a direct voltage intermediate circuit which is coupled to the output terminals of the energy storage device and is connected in parallel with the energy storage device and the fuel cell system.

According to a further embodiment of the drive system according to the invention, the drive system can also have at least one high-voltage load which is coupled to the output terminals of the energy storage device and is connected in parallel with the energy storage device and the fuel cell system.

According to a further embodiment of the drive system according to the invention, the at least one high-voltage load can comprise a direct voltage transformer which couples the energy storage device and the fuel cell system to a low-voltage power system.

According to a further embodiment of the drive system according to the invention, the control device can also be configured to detect the current power demand of the electrical drive system and to actuate the coupling devices of the energy storage modules as a function of the determined power demand in order to adapt the output voltage of the energy storage device to the fuel cell system.

According to a further embodiment of the drive system according to the invention, the control device can also be configured to detect the current power demand of the electrical drive system and to regulate the power consumption of one or more of the high-voltage loads as a function of the determined power demand.

According to a further embodiment of the drive system according to the invention, the drive system can also have an inverter which is coupled to the energy storage device and the fuel cell system and is fed thereby with the supply voltage, and an electric machine which is coupled to the inverter.

Further features and advantages of the embodiments of the invention can be found in the following description with reference to the appended drawings.

BRIEF DESCRIPTION OF THE DRAWINGS

In the drawings:

FIG. 2 shows a schematic illustration of an exemplary embodiment of an energy storage module of an energy storage device according to a further embodiment of the present invention;

FIG. 3 shows a schematic illustration of a further exemplary embodiment of an energy storage module of an energy storage device according to a further embodiment of the present invention;

FIG. 4 shows a schematic illustration of a current/voltage characteristic curve of a fuel cell according to a further embodiment of the present invention.

DETAILED DESCRIPTION

Figure 1:
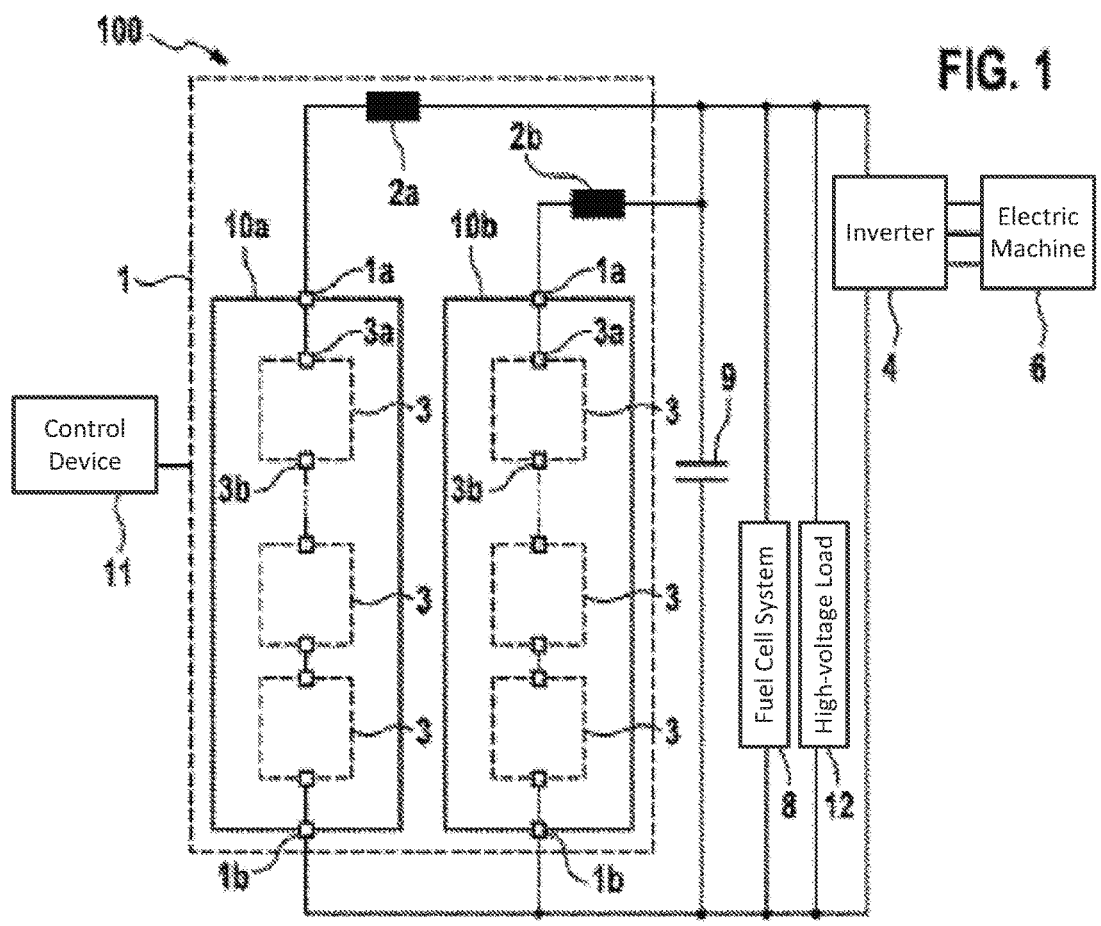
FIG. 1 shows a schematic illustration of an electrical drive system having a fuel cell and an energy storage device according to an embodiment of the present invention.

FIG. 1 shows a system 100 which comprises an energy storage device 1 for providing a supply voltage by means of energy supply lines 10a, 10b, which can be connected in parallel, between two output terminals of the energy storage device 1. The energy supply lines 10a, 10b each have line terminals 1a and 1b. The energy storage device 1 has at least two energy supply lines 10a, 10b which are connected in parallel. For example, the number of energy supply lines 10a, 10b in FIG. 1 is two, but any other relatively large number of energy supply lines 10a, 10b is also possible. It can equally also be possible in this case to connect just one energy supply line 10a between the line terminals 1a and 1b, which in this case form the output terminals of the energy storage device 1.

Since the energy supply lines 10a, 10b can be connected in parallel via the line terminals 1a, 1b of the energy supply lines 10a, 10b, the energy supply lines 10a, 10b act as current sources with a variable output current. The output currents of the energy supply lines 10a, 10b are summed here at the output terminal of the energy storage device 1 to form a total output current.

The energy supply lines 10a, 10b can each be coupled here to the output terminal of the energy storage device 1 via storage inductors 2a, 2b. The storage inductors 2a, 2b can, for example, be lumped or distributed components. Alternatively, parasitic inductors of the energy supply lines 10a, 10b can also be used as storage inductors 2a, 2b. By correspondingly actuating the energy supply lines 10a, 10b, the flow of current into the direct voltage intermediate circuit 9 can be controlled. If the average voltage upstream of the storage inductors 2a, 2b is higher than the instantaneous intermediate circuit voltage, a flow of current into the direct voltage intermediate circuit 9 occurs, and on the other hand if the average voltage upstream of the storage inductors 2a, 2b is lower than the instantaneous intermediate circuit voltage, a flow of current into the energy supply line 10a or 10b occurs. The maximum current is limited in this case by the storage inductors 2a, 2b in interaction with the direct voltage intermediate circuit 9.

In this way, each energy supply line 10a or 10b acts, via the storage inductors 2a, 2b, as a variable current source which is suitable both for a parallel connection and for implementing intermediate current circuits. In the case of an individual energy supply line 10a, it is also possible to dispense with the storage inductor 2a, with the result that the energy supply line 10a is coupled directly between the output terminals of the energy storage device 1.

Each of the energy supply lines 10a, 10b has at least two energy storage modules 3 which are connected in series. For example, the number of the energy storage modules 3 per energy supply line in FIG. 1 is two, but any other number of energy storage modules 3 is also possible. In this context, each of the energy supply lines 10a, 10b preferably comprises the same number of energy storage modules 3, but it is also possible to provide a different number of energy storage modules 3 for each energy supply line 10a, 10b. The energy storage modules 3 each have two output terminals 3a and 3b via which an output voltage of the energy storage modules 3 can be provided.

Exemplary designs of the energy storage modules 3 are shown in greater detail in FIGS. 2 and 3. The energy storage modules 3 each comprise a coupling device 7 with a plurality of coupling elements 7a and 7c as well as, if appropriate, 7b and 7d. The energy storage modules 3 also each comprise an energy storage cell module 5 with one or more energy storage cells 5a, 5k connected in series.

The energy storage cell module 5 can have here, for example, batteries 5a to 5k which are connected in series, for example lithium-ion batteries or lithium-ion accumulators. Alternatively, or additionally, super capacitors or double-layer capacitors can also be used as energy storage cells 5a to 5k. In this case, the number of energy storage cells 5a to 5k in the energy storage module 3 shown in FIG. 2 is, for example, two, but any other number of energy storage cells 5a to 5k is also possible.

The coupling device 7 is embodied in FIG. 2 by way of example as a full-bridge circuit with in each case two coupling elements 7a, 7c and two coupling elements 7b, 7d. The coupling elements 7a, 7b, 7c, 7d can each have an active switching element here, for example a semiconductor switch, and a free-wheeling diode connected in parallel therewith. The semiconductor switches can have, for example, field-effect transistors (FETs). The free-wheeling diodes can also each be integrated into the semiconductor switches in this case.

The coupling elements 7a, 7b, 7c, 7d in FIG. 2 can be actuated in such a way, that, for example with the aid of the control device 11 in FIG. 1, the energy storage cell module 5 is connected selectively between the output terminals 3a and 3b, or that the energy storage cell module 5 is bypassed. By suitably actuating the coupling devices 7, it is therefore possible to integrate individual ones of the energy storage modules 3 selectively into the series connection of an energy supply line 10a, 10b.

With reference to FIG. 2, the energy storage cell module 5 can be connected, for example, in the forward direction between the output terminals 3a and 3b in that the active switching element of the coupling element 7d and the active switching element of the coupling element 7a are placed in a closed state, while the two other active switching elements of the coupling elements 7b and 7c are placed in an open state. In this case, the module voltage is present between the output terminals 3a and 3b of the coupling device 7. A bypass state can be set, for example, by placing the two active switching elements of the coupling element 7a and 7b in a closed state, while the two active switching elements of the coupling elements 7c and 7d are kept in an open state. A second bypass state can be set, for example, by placing the two active switches of the coupling elements 7c and 7d in a closed state, while the active switching elements of the coupling elements 7a and 7b are kept in an open state. In both bypass states, a voltage 0 is present between the two output terminals 3a and 3b of the coupling device 7. Likewise, the energy storage cell module 5 can be connected in the reverse direction between the output terminals 3a and 3b of the coupling device 7 by placing the active switching elements of the coupling elements 7b and 7c in a closed state, while the active switching elements of the coupling elements 7a and 7d are placed in an open state. In this case, the negative module voltage is present between the two output terminals 3a and 3b of the coupling device 7.

The total output voltage of an energy supply line 10a, 10b can be set here in each case in steps, wherein the number of steps is scaled with the number of energy storage modules 3. Given a number of n first and second energy storage modules 3, the total output voltage of the energy supply line 10a, 10b can be set in n+1 steps between the voltage 0 and the positive total voltage.

FIG. 3 shows a further exemplary embodiment of an energy storage module 3. The energy storage module 3 shown in FIG. 3 differs from the energy storage module 3 shown in FIG. 2 only in that the coupling device 7 has two instead of four coupling elements which are connected in a half bridge connection instead of in a full-bridge connection.

In the illustrated embodiment variants, the active switching elements of the coupling devices 7 can be embodied as power semiconductor switches, for example in the form of IGBTs (insulated-gate bipolar transistors), JFETs (junction field-effect transistors) or as MOSFETs (metal-oxide semiconductor field-effect transistors).

In order to obtain an average voltage value between two voltage steps which are predefined by the gradation of the energy storage cell modules 5, the coupling elements 7a, 7c and, if appropriate 7b, 7d of an energy storage module 3 can be actuated in a clocked fashion, for example with pulse-width modulation (PWM), with the result that the respective energy storage module 3 supplies, when averaged over time, a module voltage which can have a value between zero and the maximum possible module voltage determined by the energy storage cells 5a to 5k. The actuation of the coupling elements 7a, 7b, 7c, 7d can be performed here, for example, by a control device, such as the control device 11 in FIG. 1, which is configured to carry out, for example, current regulation with a subordinate voltage controller, with the result that stepped switching on or off of individual energy storage modules 3 can take place.

The drive system 100 comprises, in addition to the energy storage device 1 with the energy supply lines 10a, 10b also a direct voltage intermediate circuit 9, an inverter 4 and an electric machine 6. For example, the system 100 in FIG. 1 serves to feed a three-phase electric machine 6. However, it can also be provided that the energy storage device 1 is used to generate electric current for the energy supply power system. Alternatively, the electric machine 6 can also be a synchronous machine or asynchronous machine, a reluctance machine or brushless direct current motor (BLDC).

The direct voltage intermediate circuit 9 in the exemplary embodiment in FIG. 1 feeds a pulse-controlled inverter 4, which provides a three-phase alternating voltage for the electric machine 6 from the direct voltage of the direct voltage intermediate circuit 9. However, it is also possible to use any other type of transformer for the inverter 4, depending on the voltage supply required for the electric machine 6, for example a direct voltage transformer. The inverter 4 can be operated, for example, in a space vector pulse width modulation (SVPWM).

The drive system 100 additionally comprises a fuel cell system 8 composed of one or more fuel cells which are connected directly in parallel with the output terminals of the energy storage device 1 or of the direct voltage intermediate circuit 9. If the fuel cell system 8 has sufficient capacity, it is also possible to dispense with the direct voltage intermediate circuit 9. The fuel cells of the fuel cell system can supply various output currents with different operating voltages, for example as a function of the temperature, pressure, damp moisture and gas concentration at the electrodes. Exemplary current/voltage characteristic curves K1, K2 and K3 of such fuel cells are shown schematically in the diagram illustrated in FIG. 4. Here, the variation P of the hydrogen concentration or oxygen concentration has the greatest effect on the shifting of the current/voltage characteristic curves. In order to operate the fuel cell system 8, for example, at the point of the greatest possible efficiency, the suitable voltage U or the suitable current I must be set for each operating point. Usually, this can be achieved without a power converter by setting the output voltage of the fuel cell system 8.

Since the output voltage of the fuel cell system 8 must correspond to the total output voltage of the energy storage device 1 through the direct connection of the fuel cell system 8 to the output terminals of the energy storage device 1, it is necessary to set the total output voltage of the energy storage device 1 according to demand by means of the corresponding actuation of the energy storage modules 3.

The system 100 can for this purpose also comprise a control device 11 which is connected to the energy storage device 1 and by means of which the energy storage device 1 can be controlled in order to provide the desired total output voltage of the energy storage device 1 at the respective output terminals for the direct voltage intermediate circuit 9, which is coupled between the output terminals, or for the fuel cell system 8.

The total output voltage of the energy storage device 1 is preferably variable over such a voltage range in such a way that a suitable output voltage can be set for each operating voltage of the fuel cell system 8. This can be done by means of a corresponding selection of the number of energy supply lines 10a and 10b or of the number of energy storage modules 3 per energy supply line 10a or 10b, with the result that even at the lowest state of charge provided for the energy storage cells 5a to 5k of the energy storage modules 3 the corresponding minimal output voltage can be provided.

The control device 11 can, for example, store predetermined characteristic diagrams of the parameter ranges for the output voltage of the energy storage device 1 and use them to actuate the coupling devices 7 of the energy storage modules 3 as a function of operating parameters determined during the operation of the drive system 100, such as the state of charge of the energy storage cells 5a to 5k, operating voltage of the fuel cell system 8, the state of charge of the direct voltage intermediate circuit 9, required power of the pulse-controlled inverter 4 or other parameters. The characteristic diagrams can correspond, for example, to the characteristic diagrams illustrated in FIG. 4. The control device 11 can then set the energy storage device 1 to the desired output voltage through corresponding actuation of one or more energy storage modules 3. In this context, the energy storage device 1 can cover a voltage range d which covers a predefined output voltage range of the fuel cell system 8.

The drive system 100 can additionally have further high-voltage loads 12 which are fed from the direct voltage intermediate circuit 9. For example, a direct voltage transformer can be used to feed a low-voltage power system, for example a 14 volt or 12 volt on-board power system of a vehicle, as a high-voltage load 12. In the low-voltage power system it is possible, for example, to feed lighting means, control units and similar applications of a vehicle which uses the electric drive system 100, by means of the fuel cell system 8 and/or the energy storage device 1.

In addition, the current power demand of the electrical drive system 100, for example the power demand of the high-voltage loads 12 or of the electric machine 6, can be detected by means of the control device 11. The control device 11 can then actuate the coupling devices 7 of the energy storage modules 3 as a function of the determined power demand in order to adapt the output voltage of the energy storage device 1 to the fuel cell system 8. This can be done, in particular, when the current power of the fuel cell system 8 is too low, that is to say is not in the optimum operating range. The adaptation of the output voltage of the energy storage device 1 to the fuel cell system 8 causes the fuel cell power to increase.

Loads which can be regulated, such as, for example, low-voltage loads which are fed by the direct voltage transformer between the high-voltage power system and the low-voltage power system, can be choked temporarily in their power consumption in order to equalize power fluctuations. For this purpose, for example the direct voltage transformer can be choked temporarily in the power consumption. Alternatively or additionally to this, rapid power fluctuations, in particular of loads which cannot be regulated, for example safety-rollover loads, can be temporarily buffered by the energy storage device 1. In the case of relatively long-term shifts in the power consumption, the fuel cell system 8 can be set to a new operating point, for example by re-adjusting the hydrogen supply or oxygen supply.

Figure 5:
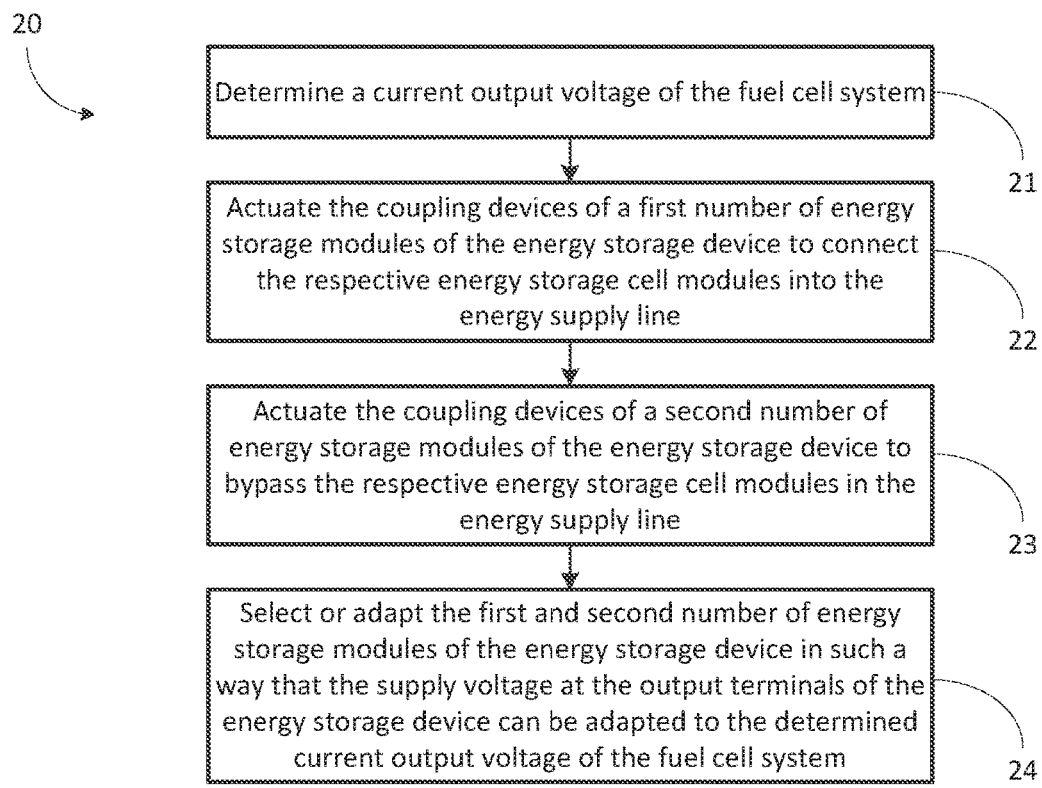
FIG. 5 shows a schematic illustration of a method for providing a supply voltage in an electrical drive system according to a further embodiment of the present invention.

FIG. 5 shows a schematic illustration of an exemplary method 20 for providing a supply voltage, in particular in an electrical drive system 100 by means of an energy storage device 1 and a fuel cell system 8, as is explained in relation to FIGS. 1 to 4. In one variant, the method 20 can be used to supply a direct voltage intermediate circuit 9 with a supply voltage, it being possible for the latter to be used to supply an inverter 4 of an electric machine 6.

In a first step 21, a current output voltage of the fuel cell system 8 is determined. In the steps 22 and 23, the coupling devices 7 of a first number of energy storage modules 3 of the energy storage device 1 can be actuated to connect the respective energy storage cell modules 5 into the energy supply line 10a or 10b, and the coupling devices 7 of a second number of energy storage modules 3 of the energy storage device 1 can be actuated to bypass the respective energy storage cell modules 5 in the energy supply line 10a or 10b.

The first and second number of energy storage modules 3 can be selected or adapted in step 24 of the energy storage device 1 in such a way that the supply voltage at the output terminals of the energy storage device 1 can be adapted to the determined current output voltage of the fuel cell system 8.

With the method 20 it is possible to achieve, in a fuel cell hybrid system with an electrical energy store, a regulating strategy in which an electrical connection can be implemented between the energy store and the fuel cell system without intermediate connection of a direct voltage converter, since the output voltages of the energy store and of the fuel cell system can be matched to one another by means of the regulation of the energy store. In particular, the desired division of the power fluxes from the energy store and fuel cell system can be adjusted by corresponding actuation of the coupling devices of the energy storage modules. As a result, it is possible to dispense with the otherwise additionally necessary hardware of the direct voltage transformer and other elements such as cooling components, with the result that a drive system which is actuated in such a way can be configured cost-effectively, with low installation space requirement and a low system weight.

The invention claimed is:

1. An electrical drive system, comprising:
an energy storage device for generating a supply voltage, the energy storage device having at least one energy supply line, each energy supply line including one or more energy storage modules connected in series in the energy supply line, each energy supply line including an energy storage cell module with at least one energy storage cell and a coupling device with a plurality of coupling elements configured to connect the energy storage cell module selectively into the respective energy supply line or to bypass the energy storage cell module in the respective energy supply line;
a fuel cell system coupled to the output terminals of the energy storage device or connected in parallel with the energy storage device; and
a control device coupled to the energy storage device, the control device configured to
determine a current output voltage of the fuel cell system, and
actuate the coupling devices of the energy storage modules in order to set at the output terminals of the energy storage device a supply voltage which corresponds to the current output voltage of the fuel cell system.

2. The electrical drive system as claimed in claim 1, further comprising: at least one storage inductor coupled between one of the output terminals of the energy storage device and the fuel cell system.

3. The electrical drive system as claimed in claim 1, further comprising: a direct voltage intermediate circuit coupled to the output terminals of the energy storage device and connected in parallel with the energy storage device and the fuel cell system.

4. The electrical drive system as claimed in claim 1, further comprising: at least one high-voltage load coupled to the output terminals of the energy storage device and connected in parallel with the energy storage device and the fuel cell system.

5. The electrical drive system as claimed in claim 4, wherein the at least one high-voltage load includes a direct voltage transformer which couples the energy storage device and the fuel cell system to a low-voltage power system.

6. The electrical drive system as claimed in claim 1, wherein the control device is configured to detect the current power demand of the electrical drive system and to actuate the coupling devices of the energy storage modules as a function of the determined power demand in order to adapt the output voltage of the energy storage device to the fuel cell system.

7. The electrical drive system as claimed in claim 4, wherein the control device is configured to detect the current power demand of the electrical drive system and to regulate the power consumption of at least one of the high-voltage loads as a function of the determined power demand.

8. The electrical drive system as claimed in claim 1, further comprising: an inverter coupled to the energy storage device and the fuel cell system and fed thereby with the supply voltage; and an electric machine is coupled to the power inverter.

9. A method for providing a supply voltage in an electrical drive system, the electrical drive system including
an energy storage device for generating a supply voltage, the energy storage device having at least one energy supply line, each energy supply line including one or more energy storage modules connected in series in the energy supply line, each energy supply line including an energy storage cell module with at least one energy storage cell and a coupling device with a plurality of coupling elements configured to connect the energy storage cell module selectively into the respective energy supply line or to bypass the energy storage cell module in the respective energy supply line,
a fuel cell system coupled to the output terminals of the energy storage device or connected in parallel with the energy storage device, and
a control device coupled to the energy storage device, the method comprising the steps:
determining, with the control device, the current output voltage of the fuel cell system;
actuating, with the control device, the coupling devices of a first number of energy storage modules of the energy storage device in order to connect the respective energy storage cell modules into the energy supply line;
actuating, with the control device, the coupling devices of a second number of energy storage modules of the energy storage device in order to bypass the respective energy storage cell modules in the energy supply line; and
determining, with the control device, the first and second number of energy storage modules of the energy storage device in such a way that the supply voltage at the output terminals of the energy storage device is adapted to the determined output voltage of the fuel cell system.

* * * * *